US012343301B2

(12) United States Patent
Liu

(10) Patent No.: US 12,343,301 B2
(45) Date of Patent: Jul. 1, 2025

(54) MALE MASTURBATING DEVICE

(71) Applicant: HYTTO PTE. LTD., Singapore (SG)

(72) Inventor: Dan Liu, Guangzhou (CN)

(73) Assignee: HYTTO PTE. LTD., Singapore (SG)

(*) Notice: Subject to any disclaimer, the term of this patent is extended or adjusted under 35 U.S.C. 154(b) by 1000 days.

(21) Appl. No.: 17/379,350

(22) Filed: Jul. 19, 2021

(65) Prior Publication Data

US 2023/0012669 A1 Jan. 19, 2023

(51) Int. Cl.
*A61H 19/00* (2006.01)

(52) U.S. Cl.
CPC ..... *A61H 19/32* (2013.01); *A61H 2201/1215* (2013.01); *A61H 2201/1669* (2013.01)

(58) Field of Classification Search
CPC ........ A61H 19/00; A61H 19/30; A61H 19/32; A61H 23/00; A61H 2201/12; A61H 2021/1207; A61H 2021/1215; A61H 2201/123; A61H 2201/1692
See application file for complete search history.

(56) References Cited

U.S. PATENT DOCUMENTS

| | | | | | |
|---|---|---|---|---|---|
| 4,790,296 | A * | 12/1988 | Segal | A61H 19/32 | 600/38 |
| 5,460,597 | A * | 10/1995 | Hopper | A61H 19/30 | 601/134 |
| 6,902,525 | B1 | 6/2005 | Jewell | | |
| 8,353,887 | B2 * | 1/2013 | Matsuura | A61B 10/0058 | 128/880 |
| 9,717,645 | B2 | 8/2017 | Fima | | |
| 10,272,011 | B1 | 4/2019 | Sloan | | |
| 2015/0119636 | A1 | 4/2015 | Yenko et al. | | |
| 2021/0186798 | A1 * | 6/2021 | Tang | A61H 19/32 | |

* cited by examiner

*Primary Examiner* — Samuel G Gilbert
(74) *Attorney, Agent, or Firm* — Holtz, Holtz & Volek PC

(57) ABSTRACT

A male masturbating device includes an elongate hollow body, a reciprocating arrangement housed within the elongate hollow body and a silicon element. The reciprocating arrangement includes an elongate hollow reciprocating-element and a driving assembly. The driving assembly includes a motion transmission mechanism operatively coupled to the elongate hollow reciprocating-element for providing a reciprocating movement to the elongate hollow reciprocating-element with respect to the elongate hollow body, and a power source for providing electrical power to the motion transmission mechanism. The silicon element includes a flexible opening. The silicon element is mounted on the elongate hollow reciprocating-element and projects out of a first end of the elongate hollow body. The silicon element is configured to move reciprocally with the reciprocating movement of the elongate hollow reciprocating-element.

5 Claims, 5 Drawing Sheets

MALE MASTURBATING DEVICE

TECHNICAL FIELD

The present disclosure relates generally to devices for sexual pleasure and, more particularly to, a male masturbating device.

BACKGROUND

Masturbation is a very common activity among adults irrespective of their gender, race and so forth. Masturbation is a natural and safe way to explore one's body, to get sexual pleasure and to release built-up sexual tension or stress.

Typically, male people use their grip of a hand for masturbating. Otherwise, people use devices for masturbating, generally known as sex toy, i.e., an object or device used for sexual stimulation or to enhance sexual pleasure. Mostly, the devices used by males for masturbating include a soft surrounding element having an opening or orifice, in which a user inserts his penis. Thereafter, either the device or the penis or both are moved back-and-forth for masturbating. Additionally, such devices are equipped with a motion generating mechanism, such as a vibrating motor operable to create a vibrating motion, which helps in providing sexual stimulation while masturbating. However, such devices fail to imitate or create a natural effect of the back-and-forth movement of a hand, which is generally desired for having a satisfying masturbating experience. Also, such devices come with very limited and controllable moving parts that can't be operable to produce a desired movement, which can then be subjected to a penis of the user for creating a desired sexual stimulation of having the satisfying masturbating experience. Therefore, the devices mentioned herein fail to provide the satisfying sexual stimulus or arousal associated with masturbating.

In light of the foregoing discussion, there exists a need to overcome the aforementioned drawbacks associated with the conventional devices for the sexual pleasure of the males.

SUMMARY

Various embodiments of the present disclosure provide a male masturbating device operable to be controlled by a user for altering masturbating parameters of the male masturbating device based a user preference and thereby providing enhanced sexual pleasure to the user for masturbation.

In an embodiment, a male masturbating device is disclosed. The male masturbating device includes an elongate hollow body having a first end and a second end. The male masturbating device also includes a reciprocating arrangement housed within the elongate hollow body. The reciprocating arrangement includes an elongate hollow reciprocating-element arranged proximal to the first end of the elongate hollow body, and a driving assembly arranged proximal to the second end of the elongate hollow body. The driving assembly includes a motion transmission mechanism operatively coupled to the elongate hollow reciprocating-element for providing a reciprocating movement to the elongate hollow reciprocating-element with respect to the elongate hollow body, and a power source for providing electrical power to the motion transmission mechanism. The male masturbating device also includes a silicon element having a flexible opening. The silicon element is mounted on the elongate hollow reciprocating-element and projects out of the first end of the elongate hollow body. The silicon element is configured to move reciprocally with the reciprocating movement of the elongate hollow reciprocating-element.

In another embodiment, a male masturbating device is disclosed. The male masturbating device includes an elongate hollow body having a first end and a second end. The male masturbating device also includes a reciprocating arrangement housed within the elongate hollow body. The reciprocating arrangement includes an elongate hollow reciprocating-element arranged proximal to the first end of the elongate hollow body, and a driving assembly arranged proximal to the second end of the elongate hollow body. The driving assembly includes a motion transmission mechanism having a plurality of connecting members and at least one motor to generate a reciprocating motion from a rotary motion. The motion transmission mechanism is operatively coupled to the elongate hollow reciprocating-element for providing adjustable reciprocating movement to the elongate hollow reciprocating-element with respect to the elongate hollow body for allowing the elongate hollow reciprocating-element to have strokes of different reciprocating lengths with respect to the elongate hollow body. The driving assembly also includes a power source for providing electrical power to the motion transmission mechanism. The male masturbating device further includes a silicon element having a flexible opening. The silicon element is mounted on the elongate hollow reciprocating-element and projects out of the first end of the elongate hollow body. The silicon element is configured to move reciprocally with the reciprocating movement of the elongate hollow reciprocating-element.

Other aspects and example embodiments are provided in the drawings and the detailed description that follows.

BRIEF DESCRIPTION OF THE FIGURES

For a more complete understanding of example embodiments of the present technology, reference is now made to the following descriptions taken in connection with the accompanying drawings in which.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification is not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Figure 1:
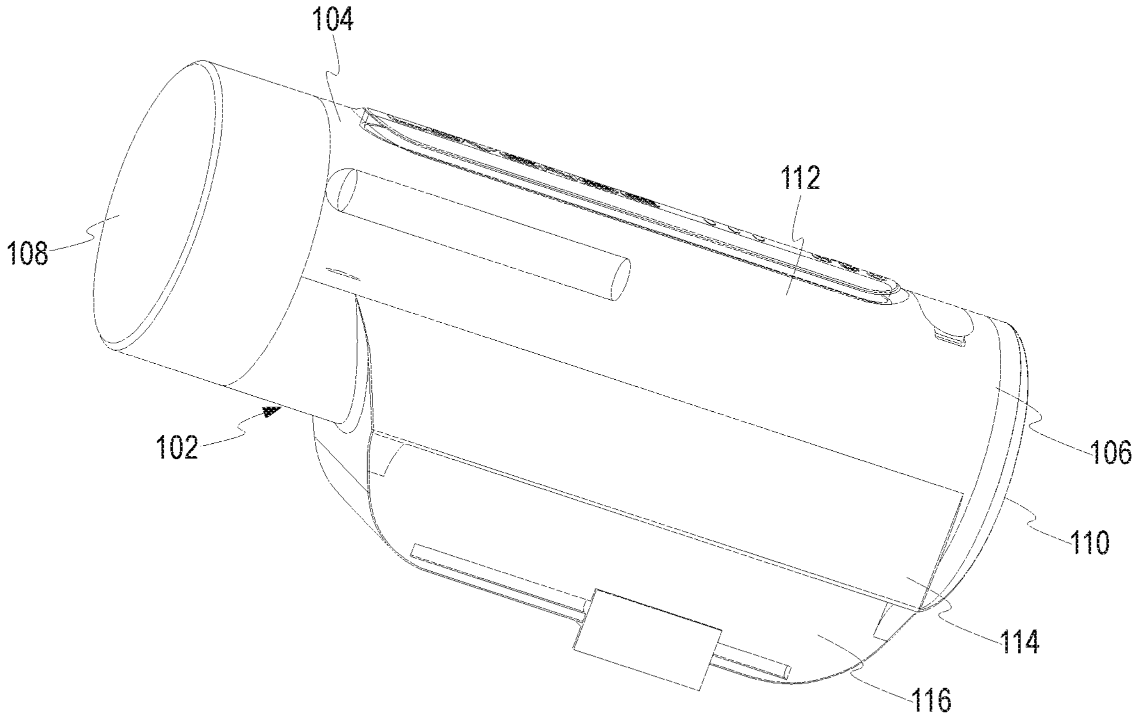
FIG. 1 is a perspective view of a male masturbating device, in accordance with an embodiment of the present disclosure.

Referring now to the drawings, FIG. 1 is a perspective view of a male masturbating device 100, in accordance with an embodiment of the present disclosure. As shown, the male masturbating device 100 includes an elongate hollow body 102 having a first end 104 and a second end 106. The elongate hollow body 102 is a hollow cylindrical structure having a diameter, a length and a wall thickness. The elongate hollow body 102 is made of a suitable material, which includes but not limited to plastic, metal, rubber, wood and any combination thereof. Further, the elongate hollow body 102 may be made of a suitable manufacturing technique, such as extrusion, molding and so forth.

According to an embodiment, the first end 104 of the elongate hollow body 102 is an open configuration and the second end 106 of the elongate hollow body 102 is a close configuration. The open configuration of the first end 104 allows access therethrough into the elongate hollow body 102, whereas the closed configuration of the second end 106 precludes access into the elongate hollow body 102.

In an embodiment, the male masturbating device 100 further includes a cap 108 for openably closing the first end 104 of the elongate hollow body 102. The cap 108 is removed from the elongate hollow body 102 for using the male masturbating device 100, and after the use of the male masturbating device 100 the first end 104 of the elongate hollow body 102 is closed with the cap 108. It is to be understood that the second end 106 of the elongate hollow body 102 also includes a cap 110, which is integral (or detachably coupled) with the second end 106 for constituting the closed configuration thereof.

According to an embodiment, the elongate hollow body 102 includes a first half-shell 112 and a second half-shell 114. The second half-shell 114 is detachably coupled to the first half shell 112. In an example, the first half-shell 112 and the second half-shell 114 may be detachably coupled to each other using a suitable coupling mechanism, such as screws, snap-fit arrangement and so forth. The detachable coupling between the first half-shell 112 and the second half-shell 114 allows in accessing components or elements housed inside the elongate hollow body 102. For example, while adjusting or repairing any internal component or element housed within the elongate hollow body 102, the first half-shell 112 may be detached from the second half-shell 114 for accessing such internal component or element. As shown, the first half-shell 112 is configured to have a shape that is substantially similar to a shape of a longitudinal half-portion of a hollow cylindrical structure. Similarly, the second half-shell 114 is configured to have a shape that is substantially similar to a shape of a longitudinal half-portion of a hollow cylindrical structure. However, in an embodiment, the second half-shell 114 is also configured to have a protruding portion 116 designed to house some internal components or elements, of the male masturbating device 100 therein, which will be explained in greater detail herein later. The protruding portion 116 may also enable in providing grip to a user for holding the male masturbating device 100. For example, while using the male masturbating device 100 the user may hold the male masturbating device 100 by grasping the protruding portion 116.

Figure 2:
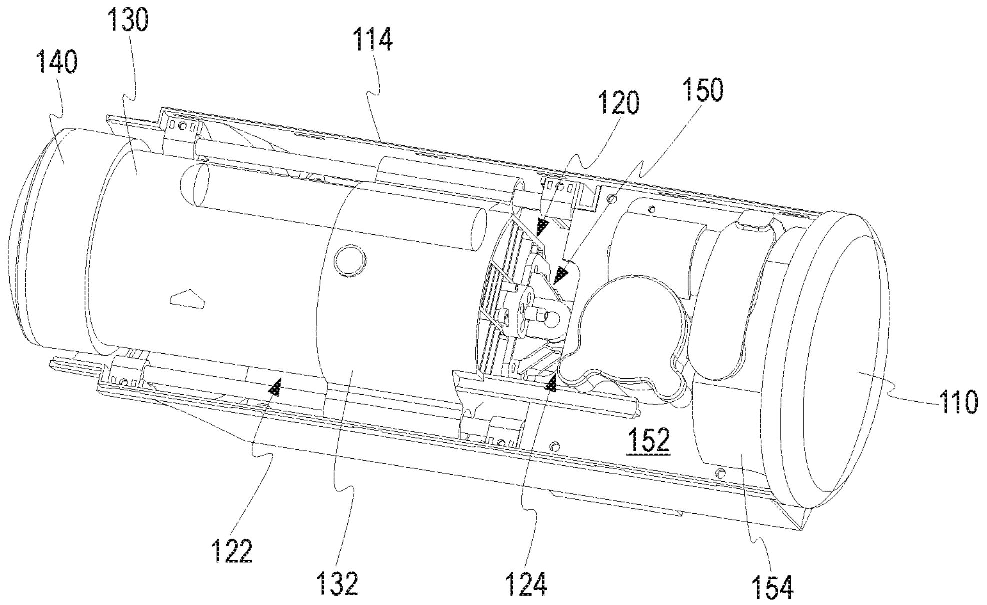
FIG. 2 is a perspective view of the male masturbating device of FIG. 1 with removed first half-shell of an elongate hollow body of the male masturbating device, in accordance with an embodiment of the present disclosure.

Referring now to FIG. 2, shown is a perspective view of the male masturbating device 100 of FIG. 1 with removed first half-shell 112 (shown in FIG. 1) of the elongate hollow body 102 (shown in FIG. 1), in accordance with an embodiment of the present disclosure. Specifically, FIG. 2 depicts the second half-shell 114 with the internal components of the male masturbating device 100 arranged inside the second half-shell 114. Also, the cap 110 is shown integral with the second half-shell 114 (i.e., at the second end 106 of the elongate hollow body 102).

As shown in the FIG. 2, the male masturbating device 100 includes a reciprocating arrangement 120 housed within the elongate hollow body 102. The reciprocating arrangement 120 includes an elongate hollow reciprocating-element 122 arranged proximal to the first end 104 of the elongate hollow body 102 (as shown in FIG. 1). The reciprocating arrangement 120 also includes a driving assembly 124 arranged proximal to the second end 106 of the elongate hollow body 102.

Figure 3:
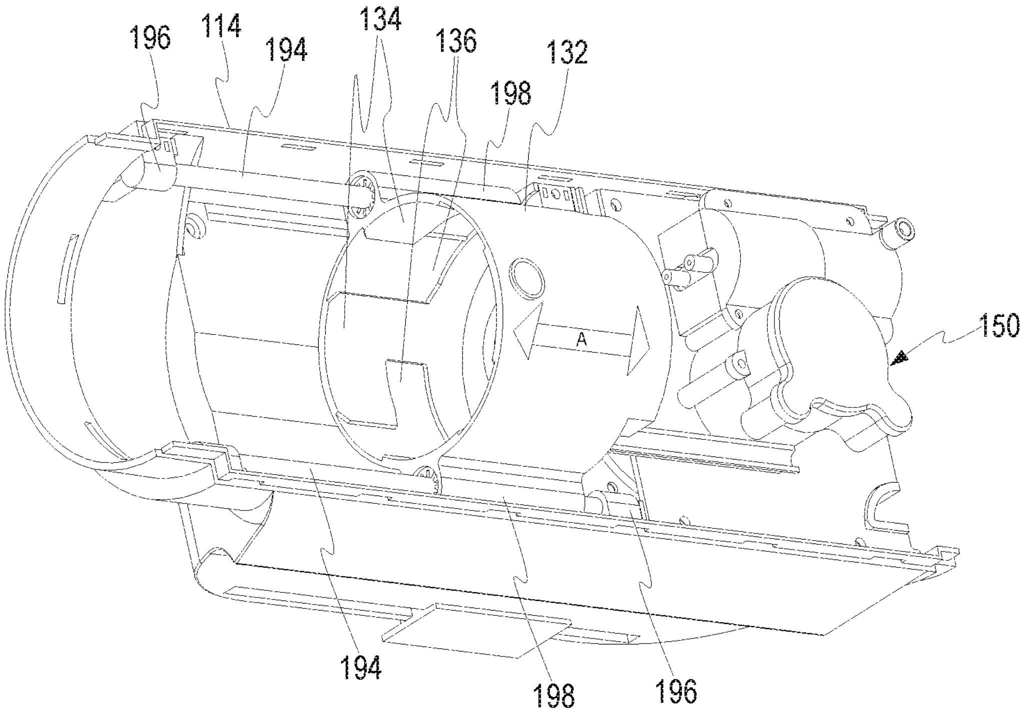
FIG. 3 is a perspective view of the male masturbating device of FIG. 2 from another angle and with further removed components, in accordance with an embodiment of the present disclosure.

The elongate hollow reciprocating-element 122 is a hollow cylindrical structure, however diametrically smaller as compared to the elongate hollow body 102. Also, the elongate hollow reciprocating-element 122 is smaller in lengthwise as compared to the elongate hollow body 102. In an embodiment, the elongate hollow reciprocating-element 122 includes a first part 130 and a second part 132 detachably coupled to the first part 130. For example, each of the first part 130 and the second part 132 includes a plurality complementary raised and lowered portions configured to slidably and rotatably coupled to each other. As shown in FIG. 3, the second part 132 includes a plurality raised portions 134 and lowered portions 136. Similarly, the first part 130 (shown in FIG. 2) includes a plurality raised and lowered portions (not shown, complementary to the raised and lowered portions 134, 136) for allowing slidable and rotatable coupling between the first part 130 and the second part 132. The detachable coupling between the first part 130 with the second part 132 allows removal and cleaning of the first part 130 (as well as the second part 132) after the use of the male masturbating device 100.

The male masturbating device 100 also include a silicon element 140. The silicon element 140 is mounted on the elongate hollow reciprocating-element 122 and projects out of the first end 104 of the elongate hollow body 102 (shown in FIG. 2). As shown, the first part 130 is mounted with the silicon element 140. As mentioned above, the first end 104 of the elongate hollow body 102 has the open configuration, this allows the silicon element 140 to project out of the first end 104. The silicon element 140 includes a flexible opening for receiving a penis of the user and configured to move reciprocally with a reciprocating movement of the elongate hollow reciprocating-element 122, which will be explained in greater detail herein later.

According to an embodiment, the silicon element 140 is configured to have a shape of a vagina. It will be evident that the silicon element 140 is configured to have the shape of the vagina to enable in creating desired sexual stimulus or arousal for user while masturbating using the male masturbating device 100. In another embodiment, the silicon element 140 is configured to have a shape of an anus. For example, the male masturbating device 100 may come with or provided with at least two removably mountable silicon elements, such the silicon element 140, one having the shape of the vagina and another having the shape of the anus. The user based on his preference can use any one of the silicon elements (either having the shape of the vagina or the anus) for masturbating. Typically, the silicon element 140 is like a cap or a cover configured to be removably (or integrally) mounted on the first part 130 of the elongate hollow reciprocating-element 122.

In an embodiment, a size of the flexible opening (not shown) of the silicon element 140 is based on accommodating a diametrical size of the penis of the user. It is to be understood that the size of the flexible opening of the silicon element 140 has to be such that it can receive therethrough penises of various sizes. Typically, the silicon element 140 is a flexible and expandable configuration, adapted to adjustably contact and surround the penis based on the size thereof. In an example, the male masturbating device 100 may be provided with multiple silicon elements, such as the silicon element 140, each having different size of the flexible opening to accommodate varying diametrical size of the penis. It is obvious that the silicon element 140 is made of silicon, however, said element may be made of any other suitable flexible material.

As mentioned herein above, FIG. 2 depicts the reciprocating arrangement 120 having the driving assembly 124 arranged proximal to the second end 106 of the elongate hollow body 102. As shown, the driving assembly 124 includes a motion transmission mechanism 150 (best shown in FIG. 4). Some of the elements constituting the motion transmission mechanism 150 are arranged under a lid (or a cover) 152. The motion transmission mechanism 150 is operatively coupled to the elongate hollow reciprocating-element 122 for providing a reciprocating movement to the elongate hollow reciprocating-element 122 with respect to the elongate hollow body 102. Specifically, the second part 132 of the elongate hollow reciprocating-element 122 is operatively coupled to the motion transmission mechanism 150.

The driving assembly 124 also includes a power source 154 for providing electrical power to the motion transmission mechanism 150. As shown, the power source 154 is shown arranged proximal to the second end 106 of the elongate hollow body 102, i.e., adjacent to the cap 110. The power source 154 is for providing one of an alternating current output or a direct current output. In an embodiment, the power source 154 includes a direct current power source, such as a rechargeable battery (for example, a lithium-ion battery), operable to provide the required electrical power for the operation of the motion transmission mechanism 150. Further, the power source 154 may include electrical and/or electronic components or circuits for enabling use of wired or wireless charging. Alternatively, the power source 154 may include electrical and/or electronic components or circuits for enabling use of alternating current to provide the required electrical power for the operation of the motion transmission mechanism 150.

Referring now to FIG. 3, shown is a perspective view of the male masturbating device 100 of FIG. 2 from another angle and with further removed components, in accordance with an embodiment of the present disclosure. As shown, the elongate hollow reciprocating-element 122 is partially shown with removed first part 130 (shown in FIG. 2) and the silicon element 140 mounted on the first part 130. The power source 154 and the cap 110 (shown in FIG. 2) are also removed from the FIG. 3.

FIG. 3 mainly depicts how the second part 132 of the elongate hollow reciprocating-element 122 is mounted or arranged on the second half-shell 114 of the elongate hollow body 102 (shown in FIG. 1), which will be explained in greater detail herein later. Further, the second half-shell 114 is shown with an arrow ‘A’ depicting direction of the reciprocating movement of the elongate hollow reciprocating-element 122. FIG. 3 also depicts the motion transmission mechanism 150, particularly, the lid 152 partially covering various internal elements or components constituting the motion transmission mechanism 150, which will be explained in greater detail herein later in conjunction with FIG. 4.

Figure 4:
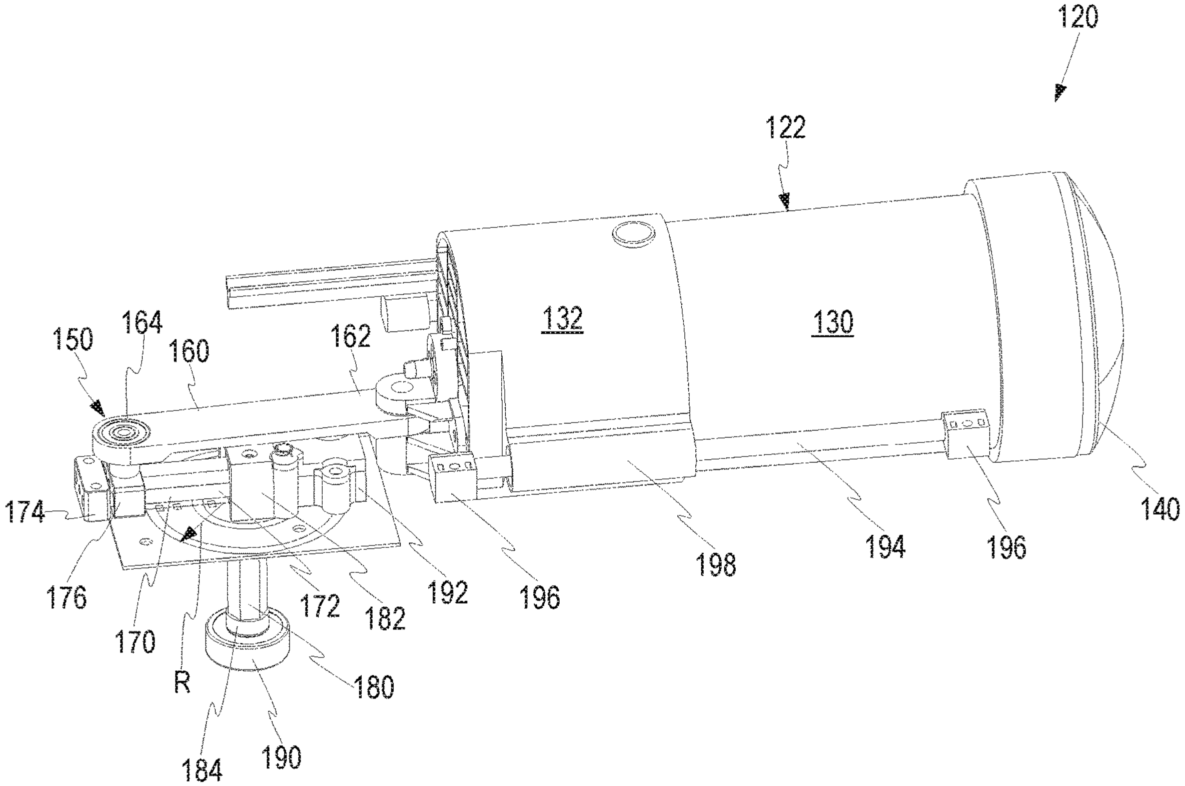
FIG. 4 is a perspective view substantially depicting a reciprocating arrangement of the male masturbating device of FIG. 2, in accordance with an embodiment of the present disclosure.

Referring now to FIG. 4, illustrated is a perspective view substantially depicting the reciprocating arrangement 120 of the male masturbating device 100 of FIG. 2, in accordance with an embodiment of the present disclosure. FIG. 4 mainly depicts the elongate hollow reciprocating-element 122 (i.e., the first and second parts 130, 132 thereof), the silicon element 140 mounted on the first part 130 of the elongate hollow reciprocating-element 122, and the motion transmission mechanism 150 operatively coupled to the second part 132 of the elongate hollow reciprocating-element 122.

According to an embodiment, the motion transmission mechanism 150 includes a plurality of connecting members, and at least one motor to generate a reciprocating motion from a rotary motion. For example, as shown in FIG. 4, the plurality of connecting members includes a reciprocating link 160 having a first end 162 and a second end 164. The first end 162 of the reciprocating link 160 is pivotally coupled to the elongate hollow reciprocating-element 122, particularly, to the second part 132 of the elongate hollow reciprocating-element 122. This allows the reciprocating link 160 to reciprocate as well as pivot with the reciprocating movement of the elongate hollow reciprocating-element 122.

The plurality of connecting members also includes a rotating link 170 having a first end 172 and a second end 174. The second end 174 of the rotating link 170 is coupled to the second end 164 of the reciprocating link 160. According to an embodiment, the second end 174 of the rotating link 170 is coupled to the second end 164 of the reciprocating link 160 using a connector 176. It is to be understood that the second end 174 of the rotating link 170 is also pivotally coupled to the second end 164 of the reciprocating link 160 for allowing the second end 164 to pivot and rotate with a rotary movement of the rotating link 170.

The plurality of connecting members also includes a shaft connector 180 having a first end 182 and a second end 184. The first end 182 of the shaft connector 180 is coupled to the first end 172 of the rotating link 170. Specifically, the first end 182 of the shaft connector 180 is slidably (or moveably) coupled to the first end 172 of the rotating link 170. This allows the first end 172 of the rotating link 170 to move longitudinally with respect to the first end 182 of the shaft connector 180. This in turn allows the rotating link 170 to have a varying radius of rotation 'R', which enables in altering a reciprocating length of the reciprocating link 160. For example, a longer radius of rotation 'R' of the rotating link 170 would allow a longer reciprocating length for the reciprocating link 160, i.e., when the first end 172 of the rotating link 170 is proximal to the first end 182 of the shaft connector 180. Similarly, a shorter radius of rotation 'R' of the rotating link 170 would allow a shorter reciprocating length for the reciprocating link 160, i.e., when the first end 172 of the rotating link 170 is distal from the first end 182 of the shaft connector 180.

According to an embodiment, the motion transmission mechanism 150 includes the at least one motor, such as a first motor 190, operatively coupled to the second end 184 of the shaft connector 180 to provide a rotary motion to the shaft connector 180. It is to be understood that representation of the first motor 190 generally depicts a shaft connecting element, which enables in operatively coupling the second end 184 of the shaft connector 180 to a shaft of the first motor 190. Additionally, the shaft of the first motor 190 may be coupled to the second end 184 of the shaft connector 180 using motion transmitting components, such as a gear arrangement and the like.

In an embodiment, the first motor 190 is operable to have a plurality of rotating speed. The plurality of rotating speed of the first motor 190 allows the user in altering a reciprocating speed of the elongate hollow reciprocating-element 122 and the silicon element 140 (mounted thereon) based on his preference. This allows the user to control a masturbating parameter, such as a varying masturbating speed, offered by the male masturbating device 100 based on the user preference. It will be evident that by altering the reciprocating speed of the elongate hollow reciprocating-element 122 (i.e., the masturbating speed) at various stages or points in time in the entire masturbating process the user would feel the enhanced sexual pleasure and satisfying masturbating experience. In an example, the male masturbating device 100 may be configured or designed to have one of a rotating knob, a slider knob or a plurality of press buttons for selecting and altering the rotary speed of the first motor 190 (i.e. for selecting and altering the masturbating speed based on the user preference).

In another embodiment, the at least one motor of the motion transmission mechanism 150 further includes a second motor 192. The second motor 192 is operatively coupled to the first end 172 of the rotating link 170. The second motor 192 is operable to slidably move the rotating link 170 (with respect to the first end 182 of the shaft connector 180) for altering the radius of rotation 'R' of the rotating link 170. Typically, in operation the second motor 192 is operable to move the first end 172 and the second end 174 of the rotating link 170 away from or towards the first end 182 of the shaft connector 180, thereby altering the radius of rotation 'R' for the rotating link 170. As mentioned herein above, it is to be understood that representation of the second motor 192 generally depicts a shaft connecting element, which enables in operatively coupling the first end 182 of the shaft connector 180 to a shaft of the second motor 192. Additionally, the shaft of the second motor 192 may be coupled to the first end 182 of the shaft connector 180 using motion transmitting components, such as a gear arrangement and the like.

In operation, by altering the radius of rotation 'R' of the rotating link 170, the reciprocating length of the reciprocating link 160 is adjusted for allowing the elongate hollow reciprocating-element 122 to have strokes of different reciprocating lengths with respect to the elongate hollow body 102. For example, the second motor 192 is operable to alter the reciprocating length of the reciprocating link 160. Typically, the second motor 192 is operable to move the first end 172 of the rotating link 170 towards or away from the first end 182 of the shaft connector 180. Therefore, when the first end 172 of the rotating link 170 is proximal or closed to the first end 182 of the shaft connector 180 (or when the second end 174 is away from the first end 182), the rotating link 170 has longer radius of rotation 'R' causing longer reciprocating length for the reciprocating link 160. Similarly, when the first end 172 of the rotating link 170 is distal or away from the first end 182 of the shaft connector 180 (or when the second end 174 is closed or proximal to the first end 182), the rotating link 170 has shorter radius of rotation 'R' causing shorter reciprocating length for the reciprocating link 160. This allows the user to control a masturbating parameter, such as a varying masturbating stroke-length, offered by the male masturbating device 100 based on the user preference.

In operation, the user can adjust the masturbating stroke-length of the male masturbating device 100 based on a length of his penis. For example, a longer masturbating stroke-length may be preferred for a longer penis size and a shorter masturbating stroke-length may be preferred for a shorter penis size. It will be evident that by altering the masturbating stroke-length of the male masturbating device 100, based on the user preference, the user would feel enhanced sexual pleasure and satisfying masturbating experience. In an example, the male masturbating device 100 may be configured or designed to have one of a rotating knob, a slider knob or a plurality of press buttons for operating the second motor 192 and thereby selecting and altering the masturbating stroke-length based on the user preference.

According to an embodiment, the motion transmission mechanism 150 further comprises a pair of sliding rails 194 (best shown in FIG. 3) interiorly mounted on the elongate hollow body 102. The pair of sliding rails 194 is slidably coupled to the elongate hollow reciprocating-element 122. As shown in FIG. 3, the pair of sliding rails 194 is arranged or coupled to the second half-shell 114 of the elongate hollow body 102. For example, each of the pair of sliding rails 194 is a cylindrical road like structure integrally mounted or arranged on the second half-shell 114 using connecting tabs 196. The second part 132 of the elongate hollow reciprocating-element 122 incudes or configured with a pair of rail-connects 198. The pair of rail-connects 198 is a hollow tubular structure integral with or coupled to diametrically opposite portions of the second part 132. The pair of rail-connects 198 is adapted to receive the pair of sliding rails 194 therethrough, thereby allowing the elongate hollow reciprocating-element 122 to slidably and reciprocally move with respect to the elongate hollow body 102. In other words, the elongate hollow reciprocating-element 122, mounted with the silicon element 140, is reciprocally and slidably moved by the motion transmission mechanism 150 with respect to the elongate hollow body 102. It may be evident that the reciprocating movement provided by the motion transmission mechanism 150 to the elongate hollow reciprocating-element 122 with respect to the elongate hollow body 102 is similar to a reciprocating movement of a piston and cylinder arrangement of an internal combustion engine.

Figure 5:
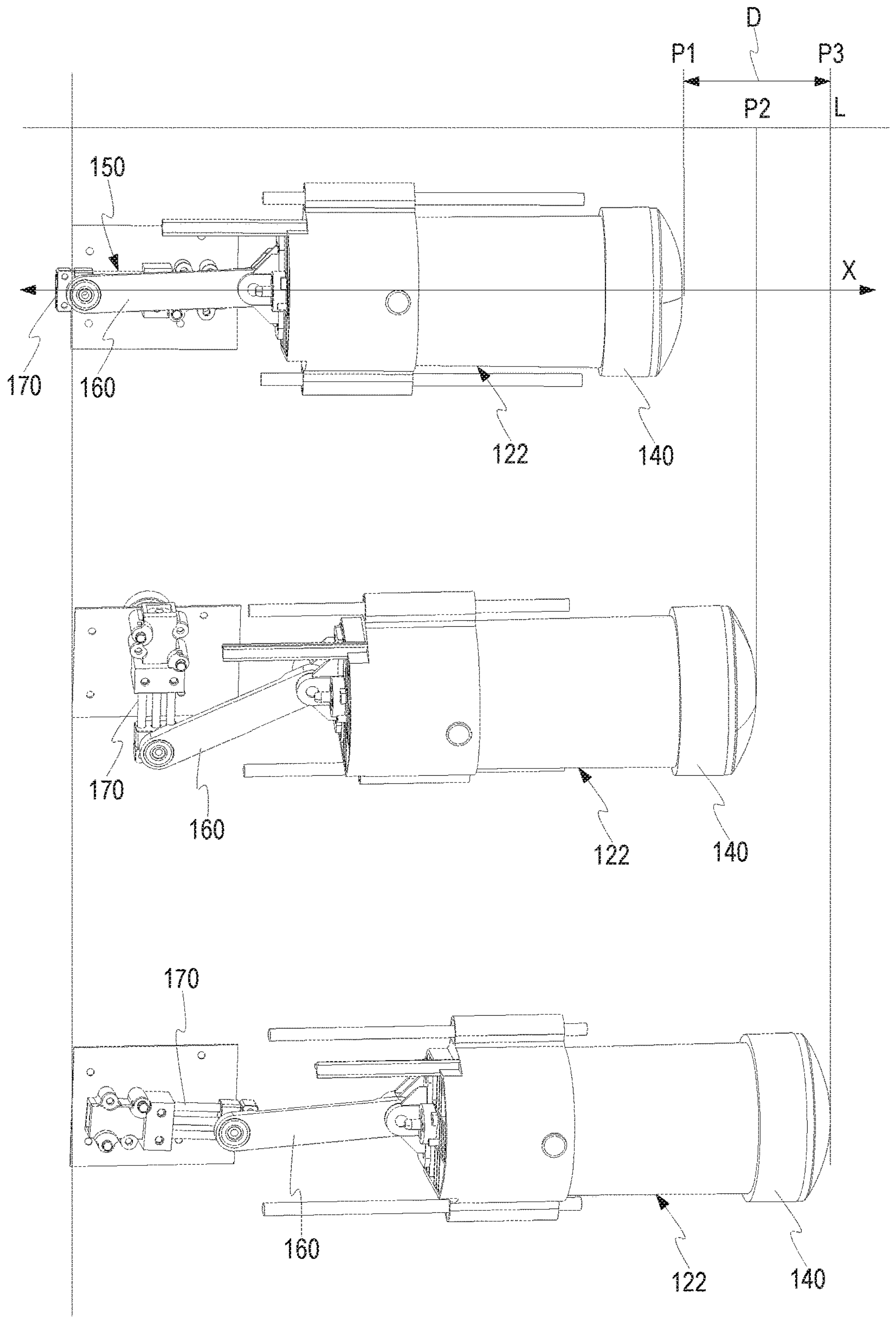
FIG. 5 are front orthogonal views of the reciprocating arrangement of FIG. 4 in operation when the elongate hollow reciprocating-element is having a reciprocating movement, in accordance with an embodiment of the present disclosure.

Referring now to FIG. 5, illustrated are front orthogonal views of the reciprocating arrangement 120 of FIG. 4 in operation when the elongate hollow reciprocating-element 122 is having a reciprocating movement, in accordance with an embodiment of the present disclosure. As shown in a top front orthogonal view of FIG. 5, the rotating link 170 (beneath the reciprocating link 160) is lying or positioned at '0' degree (or parallel) with respect to an axis 'X'. The axis 'X' depicts a direction of the reciprocating movement of the elongate hollow reciprocating-element 122 (mounted with the silicon element 140). At this point, the silicon element 140 has a relative position 'P1' on a reference line parallel to the axis 'X'.

Further, a middle front orthogonal view of FIG. 5 depicts a scenario when the rotating link 170 has moved 90 degrees (anticlockwise). The rotating link 170 pivotally moves the reciprocating link 160 to push or move the elongate hollow reciprocating-element 122 forward (i.e., towards righthand side along the axis 'X'). At this point, the silicon element 140 has a relative position P2' on the reference line. In simple words, the silicon element 140 along with the elongate hollow reciprocating-element 122 moves forward along the axis 'X'. Thereafter, a bottom front orthogonal view of FIG. 5 depicts a scenario when the rotating link 170 has moved 180 degrees (further anticlockwise). This allows the rotating link 170 to further pivotally move the reciprocating link 160 to push or move the elongate hollow reciprocating-element 122 forward (i.e., further towards the righthand side along the axis 'X'). At this point, the silicon element 140 has a relative position P3' on the reference line 'L'. In simple words, the silicon element 140 along with the elongate hollow reciprocating-element 122 has moved further forward along the axis 'X'.

As shown, a distance between the points 'P1' and 'P3' is depicted as a distance 'D', which is a masturbating stroke-length of the male masturbating device 100 for the depicted reciprocating movement of the elongate hollow reciprocating-element 122 in the FIG. 5. It will be evident that the distance 'D' would be twice (or two times) of the radius of rotation 'R' (shown in FIG. 4) of the rotating link 170. Further, by altering the radius of rotation 'R' for the rotating link 170, the masturbating stroke-length (i.e., the distance 'D') for the elongate hollow reciprocating-element 122 can be altered. Moreover, as shown in the bottom front orthogonal view of FIG. 5, at this point, the elongate hollow reciprocating-element 122 has completed half of its reciprocal movement along the axis 'X'.

Further, the rotating link 170 is rotated to 270 degrees and thereafter 360 degrees (not shown) to complete a one cycle of reciprocal movement the elongate hollow reciprocating-element 122. However, when the rotating link 170 is rotated to 270 degrees, the rotating link 170 pivotally moves the reciprocating link 160 to pull the elongate hollow reciprocating-element 122 backward (i.e., towards left hand side along the axis 'X'). At this point, the silicon element 140 would have the same relative position 'P2' on the reference line 'L'. Moreover, when the rotating link 170 is further rotated to 360 degrees, the rotating link 170 pivotally moves the reciprocating link 160 to pull the elongate hollow reciprocating-element 122 backward (i.e., further towards left hand side along the axis 'X'). At this point, the silicon element 140 would have the same relative position 'P1' on the reference line 'L'. Moreover, at this point (when the rotating link 170 completes the 360 degrees rotation), the elongate hollow reciprocating-element 122 would complete one cycle of the reciprocal movement along the axis 'X'.

In use or operation of the male masturbating device 100 of the present disclosure, the user will remove the cap 108 from the elongate hollow body 102 of the male masturbating device 100. Thereafter, the user would insert his penis (either in erected or non-erected condition) through the silicon element 140. This will allow the silicon element 140 to flexibly surround and contact the penis of the user. Thereafter, the user will switch (or turn) on the male masturbating device 100 for subjecting his penis to the reciprocating movement of the silicon element 140. It is obvious that the user will subject his penis to the reciprocating movement for number of times, till ejaculation. After ejaculation, the user can remove the silicon element 140 (with or without the first part 130 of the elongate hollow reciprocating-element 122) for cleaning. After cleaning, the silicon element 140 is re-installed and the male masturbating device 100 is ready for use again. Finally, after the use and cleaning, the user will close the cap 108 and can store the male masturbating device 100 is a suitable place.

Embodiments of the present disclosure substantially eliminate or at least partially address the aforementioned problems in the background and provide a male masturbating device. The male masturbating device of the present disclosure is designed to imitate and automatically produce natural handjob movement for user to masturbate. The male masturbating device can be used by simply inserting penis of the user through an opening in a silicone element of the male masturbating device. Thereafter, the male masturbating device can be turned on for allowing the silicone element to reciprocate along the penis of the user. At this point, the silicone element flexibly surrounds and contacts an outer circumferential area of the penis to imitate and produce the natural handjob movement (i.e., for gently massaging the penis). In the process, the user can alter the masturbating parameters (i.e., the masturbating speed and the masturbating stroke-length of the device) based on the user preference and thereby experiencing enhanced sexual pleasure of masturbation. Specifically, the ability to control the masturbating parameters based on the user preference while masturbating, i.e., to produce various permutations and combinations of masturbating speed and stroke-length for masturbation, allows the user to experience enhanced sexual pleasure.

The embodiments illustrated and described herein as well as embodiments not specifically described herein but within the scope of the aspects of the invention constitute an exemplary male masturbating device.

The benefits and advantages described above may relate to one embodiment or may relate to several embodiments. The embodiments are not limited to those that solve any or all of the stated problems or those that have any or all of the stated benefits and advantages.

Aspects of any of the examples described above may be combined with aspects of any of the other examples described to form further examples without losing the effect sought.

The above description is given by way of example only and various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

What is claimed is:

1. A male masturbating device, comprising:

an elongate hollow body having a first end and a second end;

a reciprocating arrangement housed within the elongate hollow body, the reciprocating arrangement comprising:

an elongate hollow reciprocating-element arranged proximal to the first end of the elongate hollow body, and a driving assembly arranged proximal to the second end of the elongate hollow body, the driving assembly comprising:

a motion transmission mechanism having a plurality of connecting members and at least one motor to generate a reciprocating motion, the motion transmission mechanism being operatively coupled to the elongate hollow reciprocating-element to provide adjustable reciprocating movement to the elongate hollow reciprocating-element with respect to the elongate hollow body, and the motion transmission mechanism comprising a second motor configured to electrically adjust the reciprocating movement of the elongate hollow reciprocating-element, wherein adjusting the reciprocating movement of the elongate hollow reciprocating-element with respect to the elongate hollow body allows the elongate hollow reciprocating-element to have strokes of different reciprocating lengths with respect to the elongate hollow body, and a power source configured to provide electrical power to the motion transmission mechanism; and a silicon element having a flexible opening, the silicon element being mounted on the elongate hollow reciprocating-element and projecting out of the first end of the elongate hollow body, and the silicon element being configured to move reciprocally in accordance with the reciprocating movement of the elongate hollow reciprocating-element.

2. The male masturbating device as claimed in claim 1, wherein the plurality of connecting members comprise:

a reciprocating link having a first end and a second end, the first end of the reciprocating link being coupled to a second part of the elongate hollow reciprocating-element;

a rotating link having a first end and a second end, the second end of the rotating link being coupled to the second end of the reciprocating link; and a shaft connector having a first end and a second end, the first end of the shaft connector being coupled to the first end of the rotating link.

3. The male masturbating device as claimed in claim 2, wherein the motion transmission mechanism further comprises a first motor operatively coupled to the second end of the shaft connector to provide a rotary motion to the shaft connector.

4. The male masturbating device as claimed in claim 2, wherein the second motor is operatively coupled to the first end of the rotating link, the second motor being operable to slidably move the rotating link so as to alter a radius of rotation of the rotating link.

5. The male masturbating device as claimed in claim 1, wherein the silicon element is configured to have a shape of a vagina, and a size of the flexible opening of the silicon element is based on accommodating a diametrical size of a penis of a user.

* * * * *